United States Patent

[11] 3,556,098

[72] Inventors John W. Kanwisher
Box 53, Woods Hole, Mass. 02543;
Walter A. Starck II, Box 592, Big Pine Key, Fla. 33043
[21] Appl. No. 780,961
[22] Filed Dec. 4, 1968
[45] Patented Jan. 19, 1971

[54] APPARATUS FOR CONTROLLING ENVIRONMENTAL CONDITIONS, SUITABLE FOR USE UNDERWATER
8 Claims, 4 Drawing Figs.

[52] U.S. Cl. .................................................. 128/142,
137/93; 204/195
[51] Int. Cl. ................................................. A62b 7/02
[50] Field of Search .......................................... 128/142,
143.2, 142.3, 188, 191, 146—147; 204/195;
73/27; 55/270; 137/93

[56] References Cited
UNITED STATES PATENTS
2,830,583  4/1958  Finney ......................... 128/142
3,410,778  11/1968  Krasberg ...................... 204/195
3,252,458  5/1966  Krasberg ...................... 128/147
3,370,457  2/1968  Lemm ........................... 73/27

*Primary Examiner*—Richard A. Gaudet
*Assistant Examiner*—G. F. Dunne
*Attorney*—Stevens, Davis, Miller & Mosher ABSTRACT: The subject of the invention described in the following specification relates to the problem of maintaining a safely breathable oxygen-containing atmosphere. Thus, the invention is especially useable under abnormal environmental conditions where it is necessary to provide and control an atmosphere suitable therein. The disclosed illustrative embodiment is a self-contained closed circuit-type underwater breathing apparatus for diver use. A plurality of oxygen sensor cells, preferably at least three, each thermistor temperature compensated, are exposed to the gas stream in the system, each providing a current resulting in voltage drop across the thermistor, directly related to oxygen concentration which voltages then are amplified and electronically processed to operate oxygen supply means, which is a solenoid valve, whereby oxygen partial pressure is constantly maintained within a predetermined range. In the processing, the amplified voltages are electronically mathematically averaged and processed to deliver a single control signal to the solenoid. The system is adjusted at atmospheric pressure to provide one-half atmosphere oxygen partial pressure at a selected voltage level, e.g. about 2.4 volts average amplified cell voltage. As the quantity of oxygen thereafter varies in use by the diver, the average voltage varies linearly and the solenoid acts responsively thereto. Each amplified cell output is also connected into an alarm circuitry so that should any cell (or two or more) provide a voltage corresponding to oxygen partial pressure below or above a predetermined safe oxygen range, an audible alarm is sounded as a warning that something is wrong in the system. Separate visual oxygen partial pressure indicators are connected into the circuitry at the electronic amplification stages so that the diver may observe the individual indications provided by each of the sensor cells and, thereupon, determine the emergency remedial steps necessary to be taken. In the exemplary three-sensor system, the probability of simultaneous or close timewise malfunctioning of more than one sensor or its directly associated circuitry is extremely low — so low that in practical use it may reasonably be taken as zero. Consequently, the diver, while of course, recognizing the remote possibility of such a plural maloccurrence, may, and in practice will, presume any two similar partial pressure indicators correctly to reflect the actual internal conditions of the system — unless, of course, his own understanding of the particular situation might rarely permit a different conclusion. Contemplating most importantly such a single maloccurrence (thereupon resulting in an alarm sounding and indications from the meters that one of the voltage inputs is spurious) the design of the system, involving as it does the aspect of solenoid valve control by the average voltage, is such that the electronic circuitry responds to limit, or stabilize, the effect of the spurious voltage input upon the average voltage. This is accomplished via transistor clipping circuitry and an associated regulated voltage source. Thereupon a nonvarying voltage, which is not outside the selected range for acceptable and safe oxygen partial pressure, constantly appears in the average voltage. Accordingly, the effective average voltage is then within the safe range and continues effectively to operate and to maintain a suitable oxygen partial pressure as long as the signals from the remaining cells are developed and delivered and they themselves are a correct measure of the oxygen partial pressure actually in the system. The system contemplates also an adjunctive, separate and exteriorly attachable sensor-indicator means by which the system may be further verified whereby the security of the diver is much enhanced. The system includes inert gas supply means which may be manually or automatically operated for supplying the remaining gas volume and pressure necessary for breathing underwater. By these and other means, the safety for the diver is enormously increased and the purpose of his dive can be accomplished under a minimum of constraint.

INVENTORS
JOHN W. KANWISHER,
WALTER A. STARCK, II

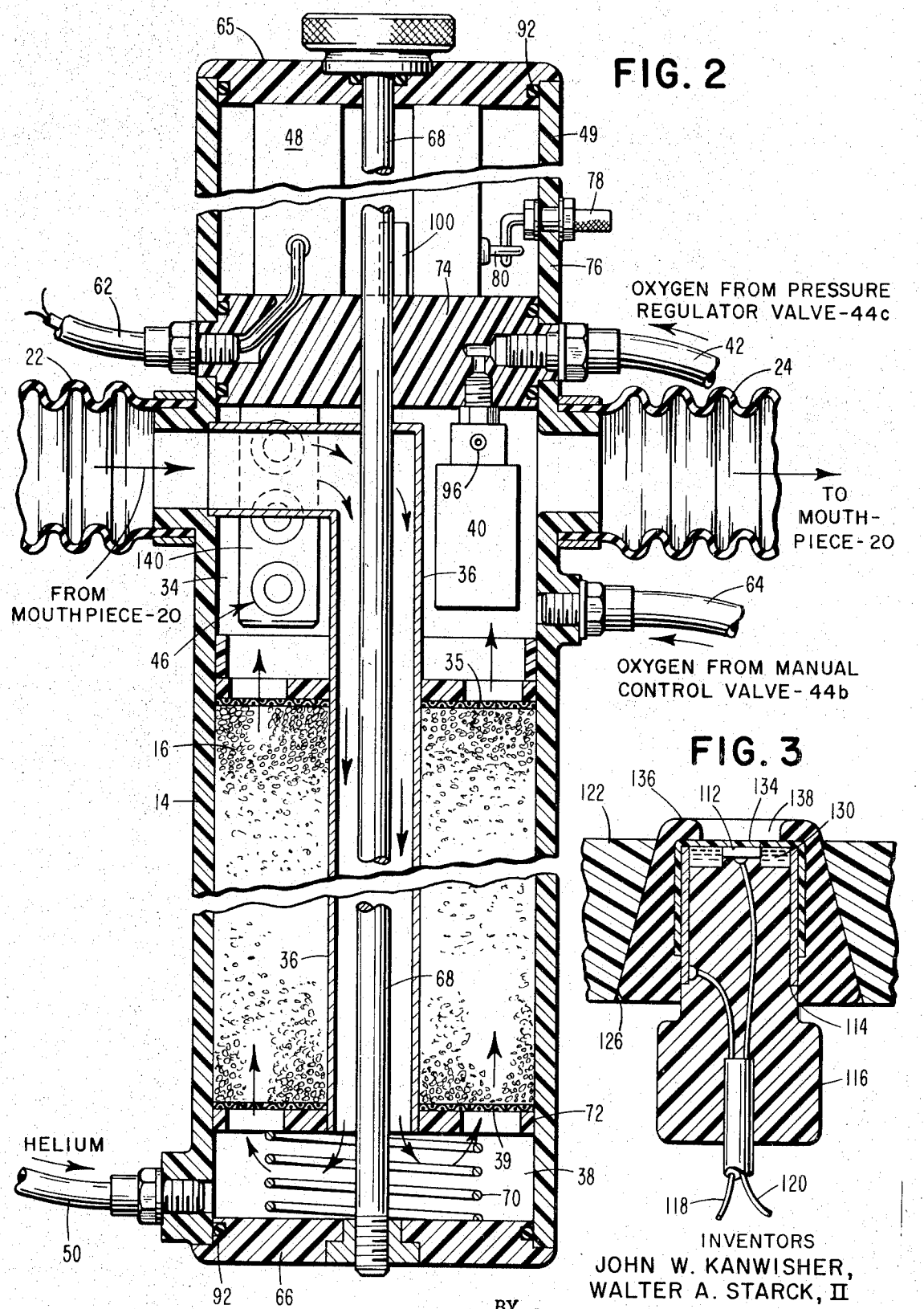

APPARATUS FOR CONTROLLING ENVIRONMENTAL CONDITIONS, SUITABLE FOR USE UNDERWATER

This invention relates to apparatus and methods for maintaining a safely breathable atmosphere, and most especially so under conditions which are not normal to human life. The invention is particularly advantageous in the underwater environment, such as in maintaining a constantly safe oxygen level in deep sea chambers and diver breathing equipment. Broadly considered, however, the invention finds application also in space apparatus and, as will appear, in instance under ordinary atmospheric pressure conditions. Further, although the invention is especially advantageously applicable to the protection of human life, it is applicable in the maintenance of a suitable atmosphere or other critical condition regardless of the object of protection or the condition desired to be maintained.

The invention in structure and modes of operation is exemplified herein by illustrating and describing underwater breathing apparatus of the self-contained closed circuit type, recently, and now more prominently, coming into use by divers. The invention is especially useful for relatively deep diving but it is equally adapted for shallow water.

Generally described, and as revealed by the prior art, the closed circuit type of diving equipment involves inhalation and exhalation within the confines of the equipment. Thus, normally none of the gases are discharged from the equipment except on ascent, when it is necessary to release internal pressure. Known units, such as shown in U.S. Pat. No 3,252,458, include a carbon dioxide "absorber," thru which the gas atmosphere is passed on inhalation or exhalation, the oxygen level being constantly monitored and replenished up to a predetermined level. As will be understood, therefore, this type of system is highly desirable because no oxygen is wasted on exhalation, and the diluent gas, usually (costly) helium in deep water, is completely conserved. Consequently, longer period underwater ventures are readily feasible and at very great saving in cost of helium.

The aforementioned U.S. Pat. No. 3,252,458 is believed to constitute the most closely allied description of apparatus relative to the present invention. This prior teaching Before an oxygen device of the class disclosed in U.S. Pat. No. 3,000,805. The sensing device as used in actual oxygen concentration determination is, or may be, technically described diver interrelation a polarographic cell. The cell is positioned in the gas stream for contact therewith following the carbon dioxide elimination stage. The cell operates to deliver a minute electric signal varying with the concentration of oxygen in the stream, oxygen actually penetrating into the cell and effecting a flow of current according to its partial pressure. The electric signal thus developed is utilized by associated electric circuitry to operate oxygen input means whereby the diver is supplied with additional oxygen from the oxygen tank as needed.

The aforesaid U.S. Pat. No. 3,252,458 constitutes a substantial advance in the art of underwater breathing. As is well known to those involved in this art, the ventures of divers involve extreme dangers to life; and even where death may be avoided, serious physiological impairment may result during a necessary but too rapid decompression. The aforesaid polarized cell, being an extremely rapid responder to oxygen, and affording thereupon a constant and reliable output signal, has rendered breathing apparatus of the type under consideration far more feasible. However, the hazards are so great as to command the greatest possible degree of certainty of continuously perfect suitability to the needs of the diver as they suddenly develop underwater; otherwise underwater technological advances will be seriously hampered by refusal of people to work in the art. In other words, practicalities considered, the ultimate in possible safety is needed. To this end, quality in component parts is essential and it is of prime importance that the entire system function properly as an assembly. Even though such be provided, failures in any equipment must be recognized as inevitable.

Serious failures are minimized to an extremely high degree by the present invention and such as may possibly occur in using this invention are reduced to a level of substantially zero criticality. This is in contrast to the prior levels of achievement of other workers which leaves much to be desired. As aforesaid the teaching of the prior art are notable and it is not intended unduly to speak disparagingly of them. However, the prior art stopped seriously short of the desirable underwater safety standards in a number of respects, and it must be pointed out the known teachings and equipment expose the diver to extremely dangerous conditions in the event of a particular type of electronic and/or associated equipment failure. Unfortunately such equipment failure is inherently possible and quite likely to occur especially in the course of use of equipment over a long period of time. This particular fault will be described more fully in relation to the present invention; however, a few brief comments at this point will serve to bring the matter to sharp focus absent surrounding shrouding complexities of other many details.

In considering this, it may be well first to recall that a 100 percent oxygen atmosphere can well be fatal to a diver in deep water, e.g. 100 feet even if breathed for only a very short time, and that lower oxygen partial pressures are equally or more dangerous particularly as the breathing time is longer or more rapid due to activity. Therefore, any system wherein oxygen partial pressure can rise beyond safe limits must provide against the occurrence of an over-oxygenated atmosphere by all possible means if it is to fulfill the safety demands of a system useful beyond the critical depth for pure or high partial pressure oxygen breathing. The system of the prior U. S. Pat. No 3,252,458 includes an electronic circuitry designed to maintain oxygen at a level selected by the diver. In this respect, the circuitry is well conceived and the occurrence of too much oxygen would not ordinarily be expected to happen under proper operating conditions of the equipment. However, as suggested above, it is again repeated that it is to be expected, in fact forecasted, in providing any equipment for such highly hazardous environment, that failures not at all necessarily the fault of an inventor will occur as an inevitable matter, the life of the diver being in the balance.

Electronic systems in general such as are disclosed by the prior art, are subject to at least two types of critical failures. The first is obvious, namely an occurrence involving an instantaneous cessation in the current flow such that it becomes immediately apparent to the diver, that all of the control equipment is for some reason totally inoperative and that emergency procedures are necessary to be employed. This type of situation is indeed very serious and the diver can be in grave danger, especially at considerable depth; but this is a situation which heretofore in general has been taken into account and emergency procedures have been established whereby the diver most probably will be able to reach the surface. However, some of the prior proposals are themselves a serious danger. For example, one approach is to supply a continuous flow of oxygen at about the minimum needed for breathing, the minimum oxygen flow being independent of the electronic metering system which supplies a selected additional optimum quantity. Thus, the diver can theoretically make his way to the surface without harm. However, providing the same minimum flow at all depths, requires a complex mass flow regulator which is prone to malfunction and does not take into account the fact that physiological requirements for oxygen may vary by a factor to 10 depending upon diver activity. The minimum flow approach is thus inherently prone to dangerous over or under oxygenation depending upon activity and minimal flow selected.

As aforesaid, this type of electronic failure involves a complete and instantaneous failure in the system whereby the metering means does not deliver oxygen in the predetermined desirable quantity. However, there is another type of failure, evidently not perceived by the prior workers in the art, such being of a less apparent and more subtle nature not involving instantaneous inaction of the metering system or circuitry.

The fault in this instance involves a slow degradation from proper function as for example in the sensing unit or amplification section, in the course of which the system continues to operate, but imperfectly. This may be described as a malfunction and, though not common, does occur. If, for example, the malfunction occurs in the sensing cell, or amplification circuitry, it will effect delivery of excess or insufficient oxygen (depending upon whether the signal output decreases or increases), the remaining equipment functioning normally, the atmosphere will shortly become over-or underoxygenated. Moreover, all indications from the equipment will read "normal" since the system will add or fail to add oxygen in whatever quantity is required to hold the signal output at the predetermined level, i.e., meters will show the oxygen content to be at, or reasonably near the proper level, alarms will not sound, and the diver will not be warned. The result can easily mean death to the diver from oxygen poisoning or anoxia unless a codiver is alert and observes abnormal behavior on the part of the endangered man. If such good fortune prevails, emergency procedure which may for example involve interchange of the breathing mouthpiece between divers can be employed while proceeding to the surface in a predetermined orderly manner, i.e., in view of decompression requirements.

Within the limits or reasonably feasible precautionary measures, and it being indisputable that absolute safety can only be approached and never quite reached, the present invention enhances the inherent safeness of the breathing system by such magnitude that the hazard of over or underoxygenation as a matter of probability due to equipment failure becomes substantially nonexistent.

Before proceeding to other attributes of the invention, which are of substantially of the same order of enhancement over known equipment, it is thought to be desirable to discuss the necessity of diver interrelation and/or interfunction with the breathing equipment. Such discussion follows in the succeeding paragraphs.

Insofar as is known, no attempts have as a practical matter been successful in interrelating diver equipment with a measurable body function in order that the diver may be warned directly of possible impending unconsciousness following equipment failure or malfunction. Therefore, in the use of presently available equipment, the diver must visually observe indicators and heed audible signals in order to protect himself in the event of equipment failure. Prior devices, particularly, for example, that according to U.S. Pat. No. 3,252,458 requires substantially continuous noting of the operating state of the system. Likewise, the present invention involves diver meter observance and attention to warning. However, the present invention goes far beyond prior provisions for warnings and, more importantly, the present invention provides the diver with actual analytical knowledge of the state of the system to an extent and of a kind far transcending the prior art. Although the diver is required to note and act upon the available information provided by the invention herein, his failure to do so for an extended period of time is not likely, by the very greatest probability, to leave him in serious circumstances. Stated in another way, though it is quite desirable for a diver to observe the state of the equipment every minute or so, the present invention affords such a high degree of protection against internal equipment a malfunction that the diver is provided with a very great margin for human failure.

The abstract of the invention will have provided an introductory amount of understanding of the present invention such that upon reflection in the course of considering the foregoing discussion, the basis for indicating the remarkable advances may be well appreciated.

Referring further to devices as known to the prior art, it should be apparent that where a single oxygen monitoring unit is employed, it being coupled with an electronic indication related to oxygen concentration, the diver can never at any time be certain of the actual oxygen concentration in the system. If, for example, the alarm circuitry were to be involved in a failure in the system, the oxygen concentration might be dangerously out of line even though the indicating meter indicated a normal and safe breathing atmosphere. The diver is entirely at the mercy of the equipment and any suspect indication must be taken as an emergency.

In overcoming the disadvantages referred to above in equipment of the closed circuit, self-contained type, and in related types of applications where oxygen concentration is critical or to be controlled, the present invention preferably employs three oxygen sensing or monitoring units, such being of the general type disclosed in U.S. Pat. No. 3,000,805. As aforesaid, these monitoring units, or cells provide a minute voltage which is proportional to oxygen concentration, the voltage varying accordingly with such concentration. The output of the cells being extremely small, three separate amplification sections are provided, each amplifying the signal from its respective signal source, that is, each cell respectively. Each amplified signal is measured through an isolating resistor by a microammeter which is scaled from zero to 100, the full scales being linearly representative of oxygen partial pressure of from about zero to about one atmosphere, individual cell outputs of from zero to about 5 volts, (more realistically about 4.7 volts in a practical operating circuit,) corresponding to the partial pressure scale. Accordingly, an amplified cell output of approximately 2.4 volts (practical embodiment, about 2.35 ) corresponds to approximately 0.5 atmospheres oxygen partial pressure.

The three signals are further processed by electronic circuitry whereby an average voltage is obtained which is thereafter processed to operate a solenoid oxygen input valve. The solenoid valve is set to deliver oxygen at times when the average amplified voltage falls below about 2.4 volts. Thus, the system normally operates to fulfill one of its intended objects, that is the provision of an oxygen concentration of approximately 0.5 atmosphere in the system. Under normal operating conditions it is not usual that the oxygen concentration would rise significantly above 0.5 atmosphere, since the supplied oxygen is constantly depleted by the diver in breathing. However, in normal operations of the equipment the solenoid valve remains closed when the average voltage rises to or above about 2.4 volts.

The system includes audible alarm circuitry deriving a signal from each of the amplified cell voltages. The alarm is electronically set to give warning if any one cell voltage falls below about 1.9 volts or rises above about 3.3 volts. The said range of 1.9 volts to 3.3 volts will be seen to correspond approximately to about 0.4 and about 0.7 atmospheres oxygen partial pressure, thus providing a range for tolerable oxygen concentration and safe breathing by the diver.

Although the present invention contemplates still further and highly important features tending to insure the safely of the diver, it is pointed out that the association of equipment described immediately above affords the diver several advantages in that the three independent signal provide him with intelligence which when coupled with his basic knowledge of the characteristics of the system enable him to reach conclusions concerning the probable state of the equipment that is not permitted by one signal, or even two signals. As will be understood, and as indicated above, a single signal affords little reliable evidence. Two signals at variance with each other merely leaves the diver in a quandry as to which signal is the correct one. Three signals, however, enable him to compare two against one and consider the intelligence as a matter of probability. The probability of two sensors being in error is, of course, the square of the probability of one being in error, and that probability decreases with decreasing time; hence the probability of two sensors malfunctioning or failing at the same time is substantially zero. Since the system will also function within safe limits on only two sensors, the same high probability of safe operation applies to the oxygen control signal. Additionally, the three signals provide a more accurate measure of the oxygen concentration in the respect that the average of the three signal tends to compensate for internal component variation from indicated values. As is well known, electronic components are true to their rated values on the basis of plus or minus about 10 percent, plus or minus 5 percent in highly select components. Internal inaccuracy of this type is compensated for in proportion to the number of separate signals processed through the electronic averaging means. In this respect it should be apparent that even two monitoring and amplification stages provide improvement in accuracy of the final applied signal. It may be mentioned in this connection, that this invention provides means in the electronic system serving as an adjustment upon each amplified monitoring output whereby, in the main, such internal inaccuracies are compensated for.

Further, however, the preferred embodiment of this invention includes additional electronic circuitry whereby any one or all of the amplified voltages is "clipped" or held at about 1.9 and 3.3 volts should it fall or rise to those limits. This clipping prevents an erroneous signal from pulling the average voltage, and hence oxygen concentration outside of safe limits. In this way the system continues to function reliably so long as the remaining two oxygen monitor signal are a reliable or correct measure of the actual oxygen concentration in the system. Thus, in the present system where three monitors are employed, one of them may be effectively eliminated and the remaining cells or monitor signals as amplified and averaged with the clipped output of the erroneous sensor will continue to deliver oxygen within the established range, and, moreover, such remaining monitor signals are effective continuously to provide the oxygen concentration at near the optimum of about 0.5 atmosphere.

The audible alarm sounds at the time of voltage clipping; therefore, the diver is made aware of the questionable functioning of the equipment, although he may have noted a disturbing condition theretofore by observation of the partial pressure indicators.

The invention further contemplates the use of a separate oxygen partial pressure indicator, the same being self contained and powered, and being provided with a microammeter reading in terms of oxygen partial pressure as the other meters of the main system. Such additional partial pressure indicator is contemplated as being constructed entirely electrically similarly to the monitor cells, the amplification circuitry and the indicator circuitry of the main equipment. Being entirely self-contained, however, it is contemplated that such unit may be employed either in combination with the main equipment, being adapted to probe the internal oxygen atmosphere thereof and respond to provide corroboration of any or all partial pressure indicators in the main system, or, it being useable in the event of failure of two sensors or even total failure of the main equipment whereby manual oxygen feed may be accomplished with knowledge of the concentration as afforded by the additional unit.

As was pointed out in the abstract presented at the forepart of this specification, the present invention proceeds from the point of view that in the continual usage of the equipment the probability of simultaneous failure of two signals in any possible respect is considered to be substantially zero. This conclusion is not only a matter of mathematics but it is based upon the facts that such equipment is contemplated as being constructed of very high quality components and assembly quality control being of the highest, both facts being in consideration of the extreme hazards that are involved in underwater work and the desire to enhance the base factors involved in the time probability calculation. Moreover, in use the equipment is card carefully checked and partly renewed before each dive. Nonetheless, superimposed upon this concept is the realization that one of two or more signal system may fail due to its own characteristic and that upon such happening if the equipment is thereafter to be realistically useable by the diver, the system must provide him with means for determining with substantially equal certainty which signal of an assembly of signals is in error. This is accomplished by providing at least three informative signals. The above-mentioned probability considerations are effectively meaningful in a diver system involving three signals, the diver observing the indications of two like signals having the high probability of correctness, and comfortably relying thereon in conducting himself in the emergency situation.

It should be appreciated that the advantages of the time probability factor as embodied in the present invention are extremely great; however, the invention proceeds beyond such point and, in the preferred embodiment, provides automatically for the continued operation of the equipment based upon the two remaining signals without the need for any attention whatsoever on the part of the diver. Considering the importance of surely providing for a minimum oxygen concentration and against amounts above a predetermined maximum oxygen concentration at all times, the feature of automatic operation to continue concentration within the limitation is regarded as quite important in that there is no time delay involved in adjusting the equipment when a signal is at variance with the true concentration present in the system. The present system relieves the diver completely of any concern regarding the reliability of the system insofar as oxygen content is concerned, and he is free to start his ascent to the surface at once without the necessity of making adjustment; and notably important, in an unalarmed mental state. Further, highly important is the fact that even though the alarm should fail to sound at the proper point, the probability of diver safety is not significantly lessened. This is because of the fact that the probability of a second failure before surfacing is extremely low; moreover (in following standard diving procedure,) the diver will have visually noted a failure and will have aborted the dive long before time under water admits of a second failure.

It is recognized that modifications of the basic approach to the system preferred herein are possible. For example, a two signal system supplemented by an exterior probe sensor-indicator affords substantial possibilities for increased information and safety. Yet, in such case, precious manipulative time is involved. Thus, it is believed that deviations from a system including at least three signals, coupled with automatic continued safe operation following the loss of one, is very difficult, if not impossible, to justify in view of the safety hazard that is involved. Where inanimate subjects are regulated in accordance with the teachings of this invention, it is recognized that some relaxing of strict adherence to the approach of the ultimate in reliability and operation may be justified.

Various other aspects of the invention will appear as the discussion thereof continues hereinafter. The invention is illustrated by drawings appended hereto; they being directed to the specific embodiment as illustrative of the invention.

In the drawings:

FIG. 2 is a vertical sectional view thru a portion of FIG. 1 wherein various parts may be seen in greater detail;

FIG. 3 is a sectional view of an oxygen detection or sensing means employed in each of three monitoring stages of FIG. 4.

Figure 1:
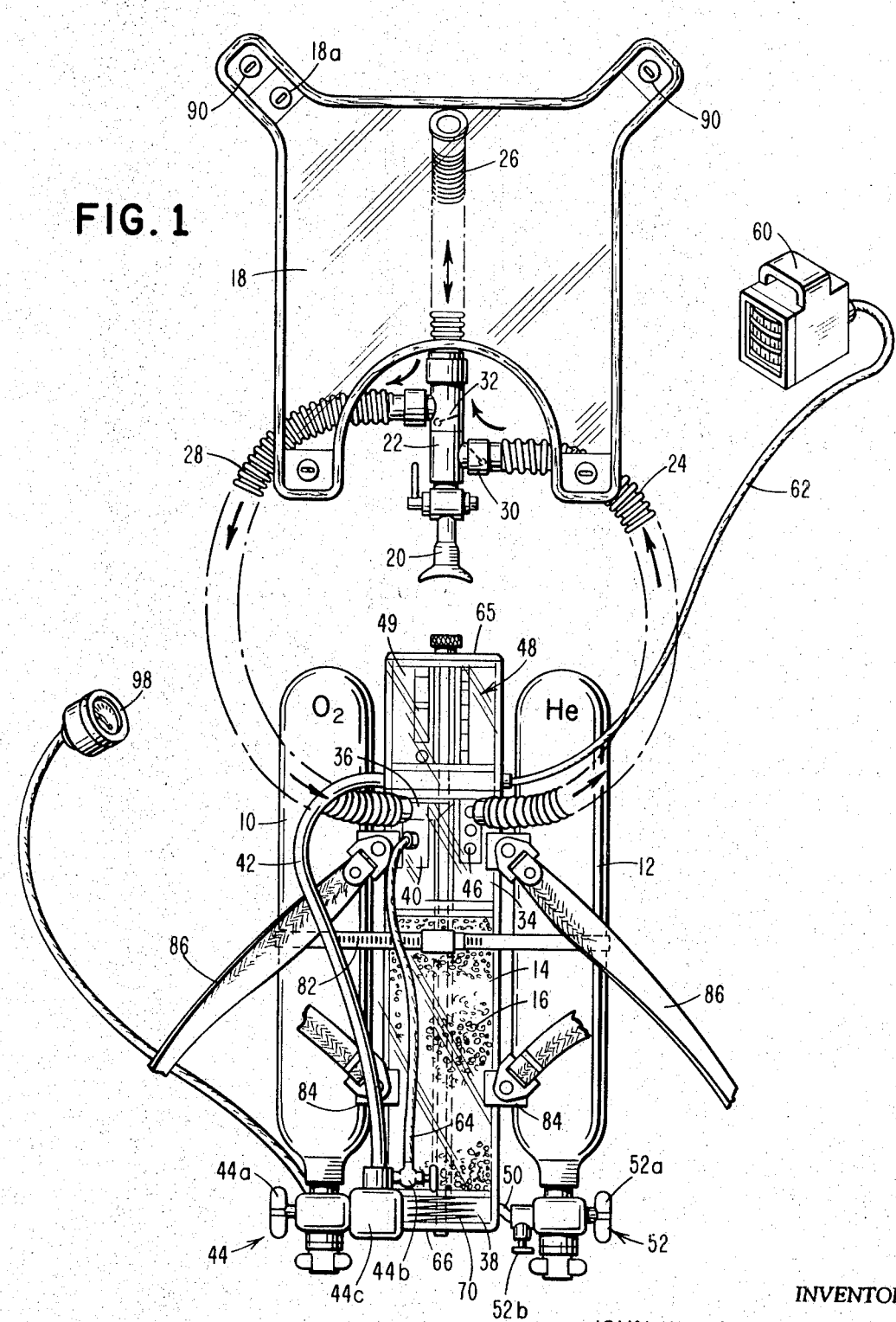
FIG. 1 is a plan view of the described embodiment showing the various parts in relative position.

Referring to FIG. 1 of the drawings, the entire apparatus is shown in the form of a layout showing the positioning and relationship of the various parts. FIG. 2 may simultaneously be considered. In the drawings numeral 10 refers to a tank for pressurized oxygen and numeral 12 refers to a tank for pressurized helium, or other inert gas. Since the apparatus is of the closed circuit type, the system contains a carbon dioxide absorbing canister denoted by numeral 14 containing an absorbent material 16. Numeral 18 denotes an expansible breathing bag which receives air discharged from the lungs upon exhalation. Numeral 20 denotes a breathing mouthpiece through which air is inhaled and exhaled. The breathing tube circuitry comprises a conduit 22 interconnecting the mouthpiece into the circuit. Numeral 24 denotes a conduit connecting into conduit 22 through which the oxygen-helium mixture is drawn on inhalation, numeral 26 denotes a conduit leading to the breathing bag 18 and numeral 28 denotes a conduit leading off of conduit 26 through which inhaled gas passes into the carbon dioxide absorbing zone before being drawn through conduit 24 to the mouthpiece. Numerals 30 and 32 denote check valves for controlling the direction of flow of the gases upon inhalation and exhalation. As will be observed check valve 30 is designed to open upon inhalation and, at the same time, check valve 32 closes, so that gases are drawn from the breathing bag through the absorbent canister to the mouthpiece. Upon exhalation, valve 32 opens to permit the passage of exhaled gas into the breathing bag, valve 30 closing simultaneously. All of the foregoing parts are well known in structure and function and do not require further detailed description.

Numeral 34 denotes an isolated portion of canister 14 which portion may be described as a chamber of the apparatus for containing the means for injecting oxygen into the system and the means for monitoring or sensing the oxygen content of the circulating gases. Chamber 34 is in direct fluid communication with the carbon dioxide absorber, as may be seen upon reference to FIG. 2 via a perforated plate or screen there shown at numeral 35. As will be seen, conduit 24 connects into chamber 34. Also, as will be seen, tube 28 connects into conduit 36, (see FIG. 2,) the latter directing the gases to the extreme end of the carbon dioxide absorber where it enters chamber 38, from which it passes reversely into and through the absorbent via perforated divider plate 39, more clearly seen in FIG. 2, upon inhalation. Chamber 38 is merely a section of the overall canister 14, the plates being therein to form a zone for retaining the carbon dioxide absorbent. Inhalation then continues to draw the gas mixture then deluded of carbon dioxide, through the absorbent into chamber 34 where its oxygen content is monitored, and from chamber 34 the gas mixture passes through conduit 24 to the diver via the connecting mouthpiece. Thus, the circuitry includes the passage of the gas from the breathing bag on inhalation through the circuitry leading to the carbon dioxide absorber and rebreathing of the exhaled gas, it being drawn through the absorber via conduit 24, the gas in its passage being treated for carbon dioxide removal, and having its oxygen supply replenished as necessary.

Oxygen replenishing takes place in chamber 34. As will be observed, the oxygen supply 10 is connected to a solenoid operated valve 40 mounted within chamber 34, oxygen line 42 providing for delivery of oxygen from the tank via the regulator 44c. Line 42 connects to the oxygen supply tank via manually operable valve assembly 44 which valve is open when the system is in use and closed when it is not.

Replenishment of oxygen occurs as the quantity of oxygen in the system lowers following its usage by the lungs and subsequent conversion to carbon dioxide. The gas mixture in the system is continuously monitored for oxygen content in chamber 34 as it flows therethrough. The monitoring is accomplished by a plurality of polarographic electrolytic cells, numeral 46 which vary their voltage output according to the oxygen content of the gas mixture. The plural assembly of the cells will be described in greater detail at a later point herein. In general, however, it may be mentioned at this point that each individual cell contains a liquid electrolyte which absorbs oxygen from the gas stream across a membrane. Thus, the high the partial pressure of oxygen in the gas mixture the greater will be the amount of oxygen absorbed by the cells. Conversely lesser oxygen partial pressure results in a smaller oxygen absorption. As aforesaid, the output of each cell varies with absorbed oxygen, output being greater with higher oxygen content and less with smaller oxygen content.

The output of each cell is delivered to an electronic processing system denoted generally by numeral 48, this system being housed, together with batteries, in separable chamber 49. The resulting signal from the electronic processing is employed as a control for the solenoid valve 40. The monitor and control system is designed and electrically proportioned to maintain the oxygen supply as nearly constant as possible, as related to a predetermined desirably oxygen partial pressure in the gas mixture. A more complete discussion of this aspect of the invention in relation to desirable physiological conditions, the electronic circuitry and the related cells, will appear hereinafter. Before proceeding with such further discussion it is desirable to complete a general description of the overall assembly.

The helium supply tank 12 is connected to chamber 38 via line 50. Line 50 connects into a valve assembly 52. Valve 52b is manually operable and serves to add helium to the gas mixture by the diver's manipulation in response to decreasing volume (deflation) of the breathing bag. As will be understood, so long as the exterior pressure resulting from the depth of the water remains constant, the gas volume in the system normally will remain constant. However, as the diver descends, pressure increases and the pressure increase is reflected by a deflation of the breathing bag. The volume required for full inhalation is resupplied when valve 52b is opened, whereby helium is admitted is in sufficient quantity to bring the volume of gas in the breathing circuitry back up to the proper level. Similarly, upon ascent the internal pressure must be relieved. Such release of pressure is readily accomplished by breathing outwardly around the mouthpiece or thru the nose, or a relief valve may be employed in the system. It will be understood that the helium volume may be automatically supplied in response to internal demands. For example, this may be accomplished by a demand regulator of any well-known type.

Numeral 60 denotes a oxygen content indicator assembly which serves to inform the diver of the oxygen content of the stream as reflected by the cells. The metering assembly will be more fully described at a later point but it may now be stated that it includes 3 meters, i.e., a separate meter for each cell, thereby separately reflecting the condition of each one of them. The indication is provided constantly and this assembly permits the diver to know immediately of deviations of each cell from its expected normal output as well as any change in oxygen partial pressure as indicated by all of the meters. The indicator assembly connects into the circuitry via leads 62.

Since the oxygen supply at all times is absolutely critical, oxygen tank 10 is provided with a bypass line 64 leading into chamber 38, through which line oxygen supply may be manually delivered by a valve 44b. As will be understood, such valve is normally closed and oxygen would not pass through this line except under emergency conditions, or when using pure oxygen for decompression at shallow depths.

Referring again to FIG. 2, it will be seen that separable chamber 49, the canister section 14, and enclosing endplates 65 and 66 are held in assembled relationship by rod 68 which threads into one endplate through a waterproof gland in the other endplate thus tying the entire assembly together. The spring 70 seen in chamber 38 serves to hold the orifice plate 72 in position thereby to maintain the absorbent material within the desired zone.

The relatively thick member denoted by numeral 74 seen between chambers 34 and 49 serves a number of purposes including the sealing of chamber 34, forming an endplate for chamber 49, an assembly base for cells units 46, solenoid valve assembly 40, the electric circuitry 48, batteries of which there are several later to be specified and a base for attaching and passing external lines such as 42 and 62 into the interior. As will be seen, the walls of chamber 49 are merely as provided by a cylindrical or tubular section seen denoted at numeral 76.

Numeral 78 denotes a switching member passing thru the wall 76 thereby enabling the exterior actuation of switch unit 80 within chamber 49.

It may be pointed out that member 74, positioned and serving as described affords significant advantages when it is necessary to service any component of the unit. This becomes apparent in noting that all of the sensing and control equipment is removable and, so removed, is held as a single assembly upon the member 74. The only attachment of the member to the device as a whole is then by way of oxygen line 42, which is easily detached. Further, a malfunctioning assembly may quickly and easily be replaced by setting a new assembly in position.

Further, the manner of assembly and provision of chambers affords the advantage that additional chambers may be added, e.g. similar to and in the manner in which chamber 49 is provided. For example, it may be desirable to attach special communication "module" and as will be apparent such may easily done. The canister-chamber units and endplates are fitted tightly and are rendered watertight as by sealing O-rings, gaskets, such as at numeral 92. Of course, all fittings attaching to the assembly are similarly made watertight. The materials employed in the construction of the canister-chamber assembly may be as desired; however clear plastic such as Lucite is quite satisfactory and offers the advantage of visual inspection for moisture and absorbent condition while diving.

The material employed for carbon dioxide removal is well known, it being sold trade name Barylyme, and being composed mainly of barium hydroxide which "absorbs" by reacting to form barium carbonate. An indicating color change is incorporated to indicate when its absorbing capacity is exhausted.

Referring to FIG. 1, the tanks and canister-chamber section are associated together by releasable metal band 82. The tanks and canister chamber section are separated by "nesting" blocks 84 which conform to the contour of the parts. Harness straps, as for example denoted by numeral 86, anchored in blocks 84 serve to hold the apparatus securely to the diver. The breathing bag 18 attaches to the harness via twist studs which are mounted on the harness and lock into the breathing bag at the shoulders and lower corners 90. The breathing bag may be of materials as desired; however clear flexible plastic such as vinyl is satisfactory and offers the advantage of visual inspection for water inside the bag. A small plug 18A provides a drain for removal of water resulting from condensation or leakage around the mouthpiece.

The mouthpiece, 20 is provided with a valve 94 serving to open and close the breathing circuit as and when desired.

Since the gas cylinders are under high pressure, needle valves are employed as a means to permit a controlled flow without experiencing heavy blasts into the equipment. Thus, valves 44b and 52b include such, and the orifice 96 for gas discharge from the solenoid valve 40 is of a type permitting flow regulation. Ideally the discharge from the solenoid valve is adjusted so that it overrides the control point by 10 to 15 percent of an atmosphere, thus it is activated for only about 3 seconds every 15 to 20 seconds and requires minimal drain on the batteries.

Numeral 98 denotes a oxygen pressure indicator providing needed information on oxygen supply level. A similar pressure indicator may be provided for the helium tank.

Figure 4:
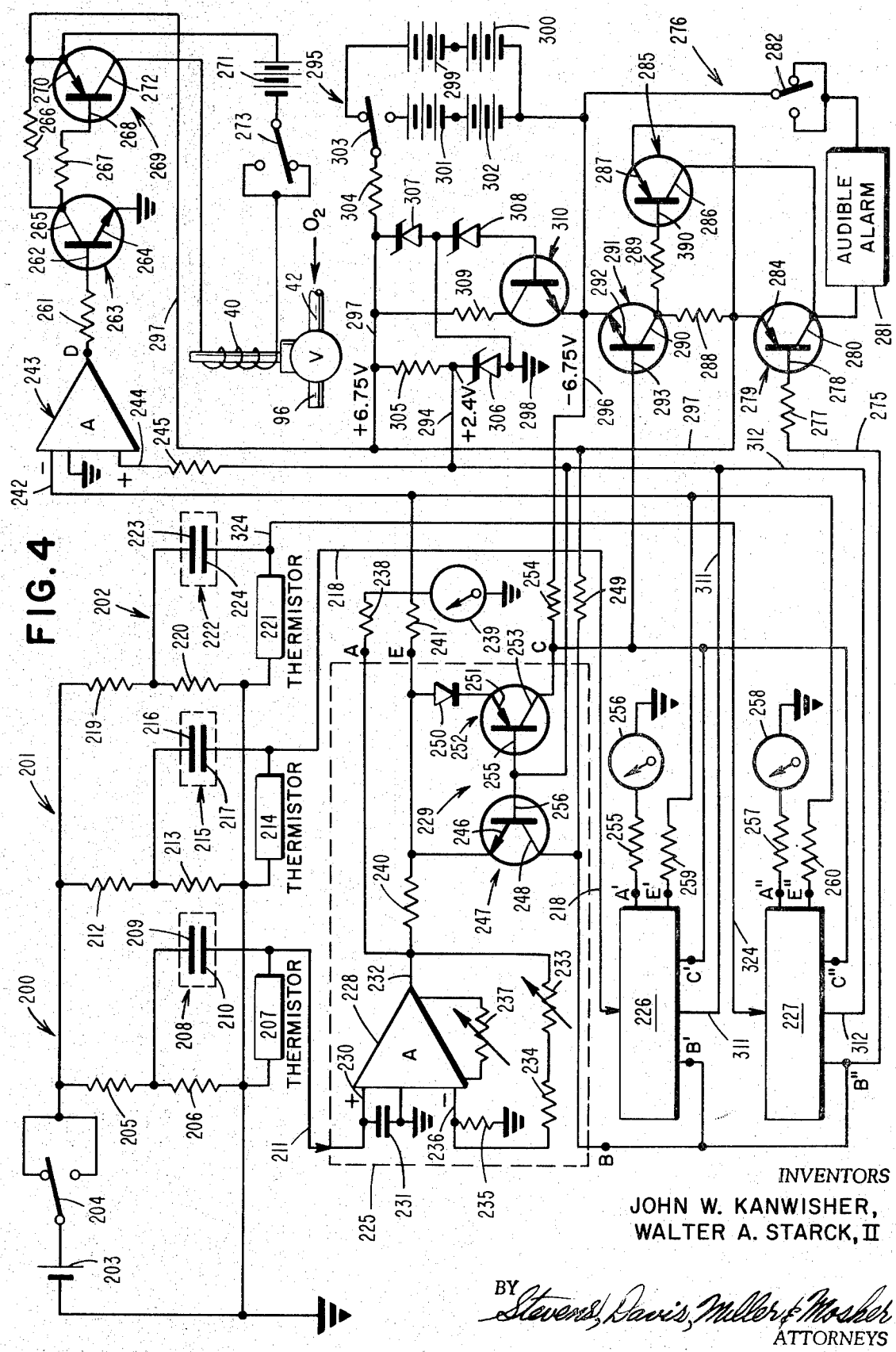
FIG. 4 is a circuit diagram of the electrical monitor-control system.

Numeral 100 denotes the alarm which suitably is fixed to member 74, being connected into the circuitry as in FIG. 4.

A solenoid-valve assembly of highest efficiency is desirable in order that the lowest power drain will be made upon the batteries. Allowing the inner plunger maximum travel produces greatest useable power. Accordingly, the same valve spring may be opened with less batter drain, allowing the use of smaller batteries. Plural solenoids and/or valves may be employed, either as standbys or they may be in tandem, operating full time in order to increase reliability.

A dessicant may be provided in the system in order to take up moisture from the diver's breath.

FIG. 3 illustrates the construction of the oxygen sensing means employed in the invention, the same being more fully discussed hereinafter in association with the electrical circuitry. In this drawing numeral 110 (numeral 208 of monitor stage 200, FIG. 4) designates the type of operating cell of monitor stages 200, 201 and 202 depicted in FIG. 4, including inner electrode 112 and outer surrounding cylindrical electrode 114 (for example, numerals 209 and 210 of FIG. 4) which may suitably be respectively of platinum and silver, the latter having a thin coating of silver oxide thereon. The electrodes, being mounted concentrically, are separated by any suitable insulating material, e.g. a plastic mass denoted by numeral 116. Leads 118 and 120 serve to connect the device into the electronic circuitry as seen in FIG. 4. The thermistor 207 seen in FIG. 4, (not shown in FIG. 3), may be mounted on the sensor retaining member 122 or may be cast in the base 116 of the electrode assembly itself so as to be in the same temperature environment as the sensing means itself. Retaining member 122 is simply a sheet or bar of any suitable material, e.g., acrylic plastic, bearing a tapered hole 126 into which the electrode assembly is inserted in the manner of a stopper. It acts only as a holder for the electrode assembly. Numeral 46 of FIG. 1 indicates such a holder with three holes for the three separate electrode assemblies. Numeral 130 denotes a liquid electrolyte, for example, potassium hydroxide, the same being contained between the electrodes in a shallow circular channel formed by the electrodes extending beyond the insulating mass 116.

Numeral 134 denotes a oxygen-permeable membrane which may be of polyethylene or any suitable material. As will be seen, the membrane fits tightly downwardly over the electrode and serves also to retain the electrolyte. Numeral 136 denotes an outer membrane-retaining member having a passageway 138 whereby the membrane is left exposed to the oxygen atmosphere while being securely held in a fixed position. The membrane retaining member is of any suitable material, e.g., silicone rubber.

As aforesaid, the cell(s) herein employed are entirely similar in design, operation and function to the cells described in prior U.S. Pat. No. 3,000,805; and the disclosure of said patent is hereby made a part of this specification. It may be noted that the herein described cell provides a shallow channel for holding potassium hydroxide, or similar acting material, rather than the fabric disc as in the patent. Thus, the general type of cell being well known, further discussion does not appear to be necessary.

Since the oxygen sensor cells operate to develop signals in the microampere range, and since the electronic circuitry is highly sensitive, it is important that the electrodes be as free of impurities as possible.

Referring now to FIG. 4, there is disclosed an illustrative embodiment of the electronic circuit of the present invention including three oxygen monitoring stages 200, 201 and 202. As shown, the three monitoring stages are energized from a suitable direct voltage source, illustrated as a single battery 203, via single-pole double-throw switch 204. Switch 204 is ganged with other switches as will be made clear hereinafter. Each stage may be energized by separate batteries in practice so that failure of a single battery will not disable all of the monitoring stages.

The first monitoring stage 200 includes a voltage divider consisting of resistors 205 and 206 connected across battery 203 via switch 204 shown in a closed position. The voltage divider may be constructed as a potentiometer having a fixed or movable tap if desired. Connected in parallel with resistor 206 is temperature compensating thermistor 207 and oxygen sensing electrolytic cell 208 connected in series. Cell 208 includes a reference electrode 209 made of silver or other suitable material, having a thin film of an oxide or other suitable material on the surface thereof and a reaction electrode 210 made of platinum. The cell includes an electrolyte, such as potassium chloride or potassium hydroxide, between electrodes 209 and 210 as seen in FIG. 3. It is known that the current flow through electrolytic cells of the type used is proportional to the concentration of oxygen to which the cell is subjected. It is known that the current flow through electrolytic cells of the nature of cell 208 is temperature dependent, and it is desirable that temperature compensation be provided. Thermistor 207 has a substantially equal but opposite temperature coefficient to that of cell 208. Inoperation, the thermistor 208 is desirably so placed that it will have the same temperature as that of the gaseous mixture being sensed. The current provided through cell 208 causes a voltage drop across thermistor 207. The output from monitoring stage 200 is taken across thermistor 207 and appears as a positive voltage on lead 211 connected to one side of thermistor 207. The other side of thermistor 207 is connected to ground.

Oxygen monitoring stages 201 and 202 are constructed in the same fashion as oxygen monitoring stage 200, and are likewise energized from battery 203 via switch 204. Monitoring stage 201 includes a voltage divider consisting of resistors 212 and 213 connected across battery 203 via switch 204. A series connected thermistor 214 and oxygen sensing cell 215 are connected in parallel with resistor 213. Electrode arrangement 215 includes a silver reference electrode 216 and a platinum reaction electrode 217. The output from monitoring stage 201 is taken across thermistor 214 and appears as a positive voltage on lead 218 connected to one side of thermistor 214, the other side of thermistor 214 being connected to ground. Oxygen monitoring stage 202 includes a voltage divider consisting of resistor 219 and resistor 220 connected across battery 203 via switch 204. A series connected thermistor 221 and oxygen sensing cell 222 are connected in parallel with resistor 220. Oxygen sensing cell 222 includes silver reference electrode 223 and platinum reaction electrode 224. The output from monitoring stage 202 is taken across thermistor 221 and appears as a positive voltage on lead 324 connected to one side of thermistor 221, the other side of thermistor 221 being connected to ground.

The three distinct voltage outputs from the three oxygen monitoring stages are fed via leads 211, 218 and 324 to signal-processing amplifiers 225, 226 and 227, respectively. The details of signal-processing amplifier 225 are shown. Signal processing amplifiers 226 and 227, illustrated as boxes, are constructed identically to signal-processing amplifier 225.

Signal-processing amplifier 225 includes a directly coupled linear operational amplifier 228 and a signal-clipping stage 229. The signal developed across thermistor 207 is fed via line 211 to the positive input terminal 230 of directly coupled linear operational amplifier 228. The operational amplifier is provided with a ground terminal and a negative input terminal 236. The positive input terminal 230 of amplifier 228 is connected to ground via capacitor 231. Numeral 232 denotes the amplifier output terminal. A negative feedback path is provided from the output terminal 232 to the negative input terminal 236 of the operational amplifier 228. The negative feedback path includes gain control variable resistor 233 and fixed resistor 234 connected in series. A resistor 235 is connected between ground and the negative terminal 236 of the operational amplifier 228. The operational amplifier 228 may be advantageously constructed as an integrated circuit, and should have sufficient gain so that its output is from zero to about 5 volts. A possible gain of about 100 is desirable. A variable resistor 237 is connected to appropriate terminals of the operational amplifier 228 or forms a part thereof for zero setting the operational amplifier 228. The output from terminal 232 of the operational amplifier 228 appears at point A which is connected via isolating resistor 238 to ground through microammeter 239. Isolating resistor 238 is preferably large enough so that even were microammeter 239 or the leads thereto shorted, the voltage at point A would not be significantly changed. The output from terminal 232 is also connected to point E via resistor 240. Point E is connected via resistor 241 to the negative input terminal 242 of a directly coupled averaging amplifier 243. The positive input terminal 244 of averaging amplifier 243 is connected via resistor 245 to a positive 2.4 -volt terminal 294 of regulated power supply 295. The regulated power supply 295, which will be described in detail below, further includes a negative 6.75-volt terminal 296, a positive 6.75-volt terminal 297, and a ground terminal 298.

Point E, the junction between resistors 240 and 241 is also coupled to signal-clipping stage 229 which includes two normally nonconductive transistors 247 and 252. Point E is connected directly to the emitter electrode 246 of normally nonconductive NPN transistor 247. The collector electrode 248 of transistor 247 is connected to the positive 6.75-volt terminal 297 of regulated power supple 295 via resistor 249. The junction between collector 248 and resistor 249 is designated point B. Point E is also connected via germanium diode 250 to the emitter electrode 251 of normally nonconductive PNP transistor 252. The collector electrode 253 of transistor 252 is connected to the negative 6.75-volt terminal 296 of the regulated power supply 295 via resistor 254. The junction between collector 253 and resistor 254 is designated point C. The base electrodes 255 and 256 of transistors 252 and 247, respectively, are connected to the positive 2.4-volt terminal 294 of the regulated power supply 295. The transistors 247 and 252 have base-emitter characteristics such that the base-emitter path becomes a conductive whenever about one-half a volt appears between the base and emitter electrodes. The characteristic of germanium diode 250 is such that is becomes conductive in a forward direction whenever about 0.4 volt appears between its plate and cathode.

Signal-processing amplifiers 226 and 227 are constructed identically to signal-processing amplifier 225 described above, and will not be separately described in detail. The points corresponding to point A, point B, point C and point E are shown for signal-processing amplifier 226 as points A', B', C', and E'; respectively, and for the signal-processing amplifier 227 as points A'', B'', C'' and E'', respectively. As can be seen, points B, B' and B'' are connected together, and points C, C' and C'' are connected together, The base terminals of normally nonconductive NPN and PNP transistors in signal-processing amplifier 226 and in signal-processing amplifier 227, which correspond to transistor 247 and transistor 252 of amplifier 225 are also connected, via leads 311 and 312 respectively, to the positive 2.4-volt terminal 294 of regulated power supply 295. Point A' of signal-processing amplifier 226 is connected to ground via series connected large isolating resistor 255 and microammeter 256. Isolating resistor 255 is a large resistor, and serves the same function as resistor 238 mentioned above. Terminal A'' of signal-processing amplifier 227 is connected to ground via series connected large isolating resistor 257 and microammeter 258. Isolating resistor 257 also is a large resistor, and serves the same function as resistor 238 mentioned above. Point E', at which the output from signal-processing amplifier 226 appears, is connected via resistor 259 to the negative terminal 242 of directly coupled averaging amplifier 243. Point E'', at which the output from signal-processing amplifier 227 appears, is connected via resistor 260 to the negative input terminal 242 of directly coupled averaging amplifier 243. Resistors 241, 259 and 260 are the same size. The output of direct current averaging amplifier 243, an operational amplifier, appears at point D which is connected via resistor 261 to the base terminal 262 of normally nonconductive NPN transistor 263. The emitter terminal 264 of transistor 263 is connected to ground. The collector terminal 265 of transistor 263 is connected to the positive 6.75-volt terminal 297 of the regulated power supply 295 via resistor 266. The collector electrode 265 is also connected via resistor 267 to the base electrode 268 of normally nonconductive PNP transistor 269. The emitter electrode 270 of transistor 269 is connected to the positive terminal of battery 271. The collector terminal 272 of transistor 269 is connected to the negative terminal of battery 271 via series connected single-pole double-throw switch 273 and the oxygen control solenoid 40.

As mentioned above, the collectors of the signal-clipping transistors 247 and 252 are coupled respectively to the positive 6.75-volt terminal 297 and the negative 6.75-volt terminal 296 of the regulated power supply 295 via resistors 249 and 254 as are the collectors of corresponding transistors, which are not shown, but form a part of signal-processing amplifiers 226 and 227. Points B, B' and B'' are also connected to a first input line 275 of alarm circuit 276. Line 275 is connected via resistor 277 to the base electrode 278 of normally nonconductive PNP transistor 279. The collector electrode 280 of transistor 279 is connected to one terminal of audible alarm 281. The other terminal of audible alarm 281 is connected via single-pole double-throw switch 282 to the negative terminal 296 of power supply 295. The collector 280 is also connected to the collector electrode 286 of normally nonconductive PNP transistor 285 which has its emitter electrode 287 connected to the positive 6.75-volt terminal 297 of the regulated power supply 295. The positive 6.75-volt terminal 297 of regulated power supply 295 is connected via series connected resistors 288 and 289 to the base electrode 390 of transistor 285. The junction between resistors 288 and 289 is connected to the collector electrode 290 of normally nonconductive NPN transistor 291. The emitter electrode 292 of transistor 291 is connected to the negative 6.75-volt terminal 296 of the regulated power supply 295. The base electrode 293 of transistor 291 is connected to point C of signal-processing amplifier 225 and points C' and C'' of signal-processing amplifiers 226 and 227.

The regulated power supply 295 includes a battery pack consisting of four 9-volt batteries 299, 300, 301 and 302. Batteries 299 and 300 are connected in series through single-pole double-throw switch 303 to positive 6.75-volt terminal 297 via resistor 304. Resistor 305 and a 2.4 volt Zener diode 306 are connected between terminal 297 and ground terminal 298. The positive 2.4-volt terminal is provide at the junction between Zener diode 306 and resistor 305. Connected in series between the positive 6.75-volt terminal 297 and the negative 6.75-volt terminal 296 is series connected resistor 309 and the collector emitter path of NPN transistor 310. The base electrode of transistor 310 is connected to the positive 6.75-volt terminal 207 via series connected 6.25-volt Zener diode 308 and 6.75-volt Zener diode 207. Switches 204, 282, 273 and 303 are preferably ganged together so as to simplify operation of the circuit. While all of the switches are shown as single-pole double-throw switches, only switch 303 serves to connect different elements into the circuit. In the position shown in the drawing, switch 303 connects series connected batteries 299 and 300 to the regulating part of power supply 295. In such a position series-connected batteries 301 and 302 are held in reserve. In the event battery 299 or battery 300 fails or becomes too low in voltage, switch 303 is used to switch to fresh reserve batteries 301 and 302.

In a practical embodiment of the illustrated circuit of the present invention, the valves and identification of components used are as follows:

| | | | |
|---|---|---|---|
| Resistor 205.. | 500Ω | Variable resistor 233...... | 0–50KΩ. |
| Resistor 206.. | 1,000Ω | | |
| Resistor 212.. | 500Ω | Variable resistor 237...... | 0–50KΩ. |
| Resistor 213.. | 1,000Ω | Operational amplifier 290.. | T–52 Philbrick. |
| Resistor 219.. | 500Ω | Averaging amplifier 243... | T–52 Philbrick. |
| Resistor 220.. | 1,000Ω | | |
| Resistor 234.. | 3.9KΩ | Capacitor 231............. | 10 uf. |
| Resistor 238.. | 47KΩ | Transistor 247............. | 2N 3903. |
| Resistor 240.. | 6.8KΩ | Transistor 252............. | 2N 3905. |
| Resistor 241.. | 27KΩ | Transistor 263............. | 2N 3903. |
| Resistor 245.. | 10KΩ | Transistor 269............. | 2N 1309. |
| Resistor 249.. | 27KΩ | Transistor 279............. | 2N 3838. |
| Resistor 254.. | 27KΩ | Transistor 286............. | 2N 3838. |
| Resistor 255.. | 47KΩ | Transistor 291............. | 2N 3903. |
| Resistor 257.. | 47KΩ | Transistor 310............. | 2N 3903. |
| Resistor 259.. | 27KΩ | Zener diode 306........... | 2.4 volts. |
| Resistor 260.. | 27KΩ | Zener diode 307........... | 6.75 volts. |
| Resistor 261.. | 27KΩ | Zener diode 308........... | 6.25 volts. |
| Resistor 266.. | 100KΩ | | |
| Resistor 267.. | 2.7KΩ | | |
| Resistor 277.. | 27KΩ | | |
| Resistor 288.. | 100KΩ | | |
| Resistor 289.. | 27KΩ | | |

The matter of zero setting and calibrating the illustrative circuit of the present invention will now be described. Microammeters 239, 256 and 258 have a scale from 0—100μ amperes. Full scale deflection is chosen to correspond to one atmosphere of oxygen. Zero deflection is chosen to correspond to complete absence of oxygen. First, ganged switches 204, 282, 273 and 303 are placed in and on position as shown in the drawing. An oxygen free gas, such as propane, is supplied to oxygen sensing cell 208 so that no oxygen appears between silver reference electrode 209 and platinum reaction electrode 210. Under these circumstances, cell 208 provides no current representing the presence of oxygen and no output representing the presence of oxygen appears across thermistor 207. Zero setting variable resistor 237 associated with operational amplifier 228 is adjusted so that meter 239 reads zero, indicating the absence of oxygen between electrodes 209 and 210. In a similar fashion, an oxygen free gas, such as propane, is supplied to electrode arrangements 215 and 222 so that no oxygen appears between electrodes 216 and 217 nor between electrodes 223 and 224. Under these circumstances, no output representing the presence of oxygen appears across thermistor 214 and thermistor 221. Zero setting variable resistors, not shown, associated with directly coupled operational amplifiers, not shown, within signal-processing amplifiers 226 and 227 are adjusted, in the same manner as variable resistor 237, so that microammeters 256 and 258 also read zero indicating the absence of oxygen between electrodes 216 and 217 and between electrodes 223 and 224. After microammeters 239, 256 and 258 have been zero set, oxygen-sensing cells 208, 215 and 222 are placed in a gaseous environment, such as air, containing approximately 20 percent oxygen at atmospheric pressure. Positive going outputs appear across each of thermistors 207, 214 and 221 which are representative of the presence of a gas containing 20 percent oxygen by volume at atmospheric pressure between electrodes 209 and 210, electrodes 216 and 217, and electrodes 223 and 224, respectively. The positive-going outputs are fed to the inputs of signal-processing amplifiers 225, 226 and 227, respectively. The gain of directly coupled operational amplifier 228 is adjusted by varying the value of variable resistor 233 in its negative feedback path. Increasing the value of resistor 233 reduces the amount of negative feedback and increases the gain of operational amplifier 228. Decreasing the value of resistor 233 increases the amount of negative feedback and decreases the gain of operational amplifier 228. The gain is adjusted until microammeter 239 deflects to 20 20 percent of full scale. When so set, the 20 percent deflection represents an oxygen concentration corresponding to a partial pressure of 0.2 atmospheres supplied to oxygen-sensing cell 208. Since operational amplifier 228 is a linear amplifier, half scale deflection would represent a concentration of oxygen corresponding to 0.5 atmosphere supplied to sensing cell 208.

In a similar manner, gain control resistors, not shown, associated with directly coupled operational amplifiers, not shown, within signal-processing amplifiers 226 and 227 are adjusted so that microammeters 256 and 258 deflect to 20 percent of full scale. When so set, 20 percent scale deflection on microammeters 256 and 258 represent a concentration of oxygen corresponding to a partial pressure of 0.2 atmospheres supplied to cells 215 and 222 respectively. Since the directly coupled operational amplifiers in signal-processing amplifiers 225 and 226 are linear, half scale deflection on respective meters would represent a concentration of oxygen corresponding to a partial pressure of 0.5 atmosphere supplied to oxygen-sensing cells 215 and 222, respectively. The circuit having been calibrated and zero set, is ready for operation.

Since the circuit has been calibrated in the manner set out above, positive voltages of approximately 4.7 volts, (1 atm.) at points A, A' and A'' and a full scale deflection of meters 239, 256 and 258 indicates a concentration of oxygen corresponding to a partial pressure of 1 atmosphere as determined from the outputs of oxygen sensing cells 208, 215 and 222 respectively. Ideally, positive voltages of 2.35 volts at points A, A' and A'' indicates a concentration of oxygen corresponding to a partial pressure of 0.50 atmospheres as sensed by the corresponding oxygen-sensing cells. As a practical matter, positive voltages of 2.4 volts at points A, A' and A'' indicates a concentration of oxygen corresponding to a partial pressure of approximately 0.5 atmosphere as sensed by corresponding sensing cells. Positive voltages at points A'A'' and A''' of approximately 1.9 volts would indicate a concentration of oxygen corresponding to a partial pressure of approximately 0.4 atmosphere, while positive voltages at points A, A' and A'' of about 3.3 would indicate an oxygen concentration corresponding to a partial pressure of approximately 0.7 atmosphere as sensed by corresponding sensing cells.

Having described the apparatus and associated circuitry, and the manner by which it is prepared for use, its functioning in use by a diver is described hereinafter. As will be appreciated, such functioning is in particular regard to the occurrences taking place in the electronic circuitry since the electrical system, beginning with the oxygen concentration monitors through to the solenoid operated valve, include the only variants, and otherwise the type of system is well understood. Of course, it will be appreciated that the oxygen monitor stages 200, 201 and 202 correspond to the sensor assembly designated by numeral 46 in FIGS. 1 and 2, and that the circuitry shown in FIG. 4 corresponds to that which is shown in block form in FIGS. 1 and 2 at numeral 48. All switches included in the circuitry must be in the on position, namely, switches 204, 273, 282 and 303, they being ganged together in actual assembly and indicated at numeral 78. The system is to be considered as in use by a diver, i.e. dynamic, during which the oxygen supply is depleted according to his requirements.

Each of the electrolytic oxygen sensing cells 208, 215 and 222 provide a current flow directly related to the concentration of oxygen in the gaseous mixture within the part of the breathing apparatus in which they have been incorporated. The currents provided by the electrolytic oxygen sensing cells 208, 215 and 222 flow through thermistors 207, 214 and 221, respectively, causing a voltage drop across each one.

The direct voltage, which is proportional to the concentration of oxygen as sensed at stage 200 appearing across thermistor 207 is fed to the input terminal of signal-processing amplifier 225 via lead 211, and appears across capacitor 231 connected to the positive terminal 230 of operational amplifier 228. An amplified output, from directly coupled operational amplifier 228, appears at point A and is directly linearly related to its input. The output from point A is fed via resistor 238 to microammeter 239 on which the percentage of deflection indicates the concentration of oxygen, i.e., zero to 1 atmosphere, as sensed by electrode arrangement 208.

As will be understood, the voltage outputs arising at stages 201 and 202 are processed identically to that of stage 200 and are fed to their respective microammeters 256 and 258. Thus, three independent amplified voltages directly related to oxygen partial pressure appear at points A, A' and A".

The amplified positive output voltage from operational amplifier 228, appearing at point A, is coupled to point E. So long as the voltage at point E remains within the range of from approximately 1.9 volts positive to approximately 3.3 volts positive corresponding to sensed oxygen partial pressure of about 0.4 atmosphere to about 0.7 atmosphere, the voltage at point A effectively appears at point E.

Referring to the voltages at points E' and E", the signals incoming to processing amplifiers 226 and 227 are processed identically to the foregoing voltage appearance at point E. Therefore, they need not be individually discussed.

Normal functioning of the apparatus in use by the diver results in voltages well above 1.9 at points E, E' and E", usually only slightly above 2,4 volts but not above about 3.3 volts, and such voltages are processed thru operational amplifier 243 and thereafter in a manner hereinafter described to operate the oxygen input solenoid valve and effect the replenishment of oxygen in the system in proportion to the lowered voltage inputs following oxygen usage by the diver. Of course, normal functioning is expected, it is intended, and it is usual in the course of using the equipment. However, the aspect of some abnormality in a system of this, or any type, whereby the diver is endangered, is of paramount interest herein. Since the final processing thru point D to the solenoid valve is discussed at a later point, and such processing is the same whether or not the input is normal, discussion or variations from normal voltages at points E, E" and E" is presented below in relation to the other important circuitry. Moreover, a very great amount of repetition will be possible to avoid, and better understanding of the circuitry will be had, by a discussion of such variations at this point together with their possible interpreted meaning by the diver in observing the indicators.

In the event either on one or more of the voltages appearing at points E, E' and E" are below or above the established range of about 1.9 volts to about 3.3 volts, the circuitry functions to hold the voltage at the limiting value. If only one signal voltage reaches the clipping point the remaining two continue to operate the system. If two or all signal voltages should reach the clipping point, the system will not operate but the meters may still be used as indicators for manual control so long as two continue to read similarly. The reason (or reasons) for the occurrence is indeed important to the diver but, herein such are not necessarily so much a matter of concern; moreover, discussion of all casual possibilities in detail would be very extensive and also is not considered to be necessary. However, for example, the cause may be a malfunction of the solenoid valve such that it is on one position full time, or on closed position full time, or batteries may be failing. If it is either, switching to the reserve batteries may restore normal operation; however, if the reserve batteries do not do so, immediate surfacing procedure is undertaken. Since the helium supply is 10 percent oxygen, it may be employed according to known techniques from maximum depth of the dive as the oxygen supply. The helium supply may be employed at any less depth; but if in shallow water, e.g. 60 feet or less, damage or danger is not likely from as much as 3.0 atmosphere oxygen for the corresponding short surfacing time. Therefore, the diver is not in serious trouble even if oxygen is fed in via the bypass line described hereinbefore and surfacing is gotten under way according to predetermined and diver-learned procedure. Additionally, if the problem is only in the solenoid valve, its oxygen supply may be cut off, and oxygen then fed via the bypass line manually, in which case the circuitry will serve to supply concentration indications.

Since fresh operational long life and similar reserve batteries are always employed as a precaution, especially in deep dives, for example, 200 feet and deeper, and/or if the time for operations at such depths is not long, batteries are not likely to cause an emergency. Similarly, if a malfunction in high quality solenoid valve equipment is most unusual if it is properly maintained, for example, free of dirt. Accordingly, unless the equipment is seriously damaged so as to sever electrical leads or bring about a total short circuit, all of the voltages appearing at points E, E' and E" are not likely to fall outside the intended range. One voltage might, however, (though not very likely) due to many causes. Such an "outside" voltage may be termed "spurious" and is treated herein in the main without regard to cause. The important point to be noted is that by the clipping of a spurious signal, in the particular system here described, the system continues to function normally —the diver has been warned by the alarm and will have noted his microammeter — oxygen indicators and unless it be quite desirable not to do so, he will begin surfacing at once. If it be quite desirable to remain submerged for a time at the working depth, the oxygen indicators supply him with intelligence from which he can make a decision in reasonable safety and with knowledge in any event that an emergency exists and that he must proceed, if at all, with due caution and attention to his system, and his physiological reactions. His "buddy" diver, of course, will have been alerted.

If in observing the oxygen indicators two are indicating nearly identically, whereas one is at odds, it will be most reasonable on the basis of statistical probability as hereinbefore explained to make the assumption that the one is faulty since it is not likely that one has correctly sensed a real danger and warned of it while two have malfunctioned in the same way at the same time because of some unrelated internal fault. (As hereinbefore indicated, it is proposed as an adjunct to this invention, and as a part thereof, that a special entirely separate oxygen concentration testing instrument be supplied for probing the internal oxygen system so that its measurement may be compared with the indicators of the main system, whereby substantially absolute certainty is afforded. Such an instrument will be obvious as to manner of construction following the teachings herein.)

From the foregoing it will be appreciated that an enormous number of different operational occurrence might be described in which the present equipment is useable. Yet, its function insofar as voltage clipping and averaging is the same. It is for the plurality of sources of information in any case invaluable to the diver, the preservation of extended operability notwithstanding the statistical failure aspect of oxygen concentration control systems, irrespective of cause or type of failure, and the very high probability of safety from oxygen poisoning or anoxia for which the invention is especially notable.

Thus, returning to the circuitry (which should not now be more readily appreciated as a whole and in relation to the diver,) the signal clipping at all of points E, E' and E'' or any one or two of them occurs electronically in the same manner via their respective circuitry, at which time the alarm circuitry is also energized. A discussion of the manner of operation of this voltage clipping circuitry is presented below. A discussion relative to the point E only is provided since the corresponding similar circuitry functions in the same manner.

In the event the voltages at point E falls to about 1.9 volts positive indicating either an oxygen partial pressure of approximately 0.4 atmosphere or some maloccurrence in the system, base-emitter current flows in normally nonconductive transistor 247 holding point E at a potential of 1.9 volts positive because of the connection of the base electrode 256 to the positive 2.4-volt terminal 294 of the regulated power supply 295. When transistor 247 conducts, its emitter-collector current flows through resistor 249 which lowers the voltage at point B causing normally nonconductive transistor 279 to conduct. The emitter-collector current of transistor 279 flows through and activates audible alarm device 281. In the event the voltage at point E rises to about 3.3 volts (0.7 atm.) positive, similarly indicating either excess oxygen concentration or a maloccurrence, current flows through diode 250 and base-emitter path of normally nonconductive transistor 252 holding point E at a potential of 3.3 volts positive because of the connection of the base electrode 255 to the positive 2.4-volt terminal 294 of the regulated power supply 295. Transistor 252 conducts; its emitter-collector current flows through resistor 254 which raises the voltage at point C causing normally nonconductive transistor 291 to conduct. The emitter-collector current of transistor 291 flows through resistor 288 lowering the voltage on collector 290, causing normally nonconductive transistor 285 to conduct. The emitter-collector current of transistor 286 flows through and activates audible alarm device 281.

As can be seen from the foregoing a processed voltage signal appears at point E which may range from about a positive 1.9 volts (representing a partial pressure of about 0.4 atmosphere) to about positive 3.3 volts (representing a partial pressure of about 0.7 atmosphere. Thus, within the range mentioned above, is a possible signal of positive 2.4 volts which represents a partial pressure of about 0.5 atmosphere.

The discussion which now follows refers to the final processing of the three signals thru the averaging amplifier to the solenoid.

The processed voltage signal appearing at point E is coupled through resistor 241 to the negative input terminal 242 of averaging amplifier 243 which is an operational amplifier. Similarly processed voltage signals, which are developed in signal-processing amplifiers 226 and 227 and appear at point E' and E'' are coupled via resistors 259 and 260, respectively, to the negative input terminal 242 of averaging amplifier 243. Since resistors 241, 259 and 260 are the same size, the three processed signals are effectively averaged, and the average signal appears on the negative input terminal of averaging amplifier 243. When any one of points E, E' or E'', is being held at a constant positive 1.9 or 3.3 volts because of the operation of the clipping stages forming part of respective signal processing amplifiers 225, 226 and 227, only the processed signals appearing at the point or points which are not clipped will contribute to the changing of the output from averaging amplifier 243. THe clipped signal will, of course, pull the average slightly from the correct value but this effect is small and of no consequence physiologically.

Whenever the average signal appearing on the negative input terminal 242 of averaging amplifier 243 passes below the selected control point of 2.4 volts, the output from averaging amplifier 243 appearing at point D reverses from extreme negative to positive. As the output at point D passes through zero and becomes positive, transistor 263 conducts lowering the voltage on its collector 265 causing transistor 269 to become conductive. When transistor 269 conducts, its emitter-collector current flows through the oxygen control solenoid valve 40 whereby it is opened. Additional oxygen is supplied to the breathing apparatus until the average signal appearing on the negative input terminal 242 of averaging amplifier 243 increases above 2.4 volts positive. The output from averaging amplifier 243 appearing at point D reverses from extreme positive to negative. As the output at point D passes through zero and becomes negative, and transistor 263 becomes nonconductive, the voltage on its collector 265 rises causing transistor 269 to become nonconductive thereby interrupting current flow in solenoid 40 allowing the oxygen supply valve to close. The cycle is constantly repeated, and additional oxygen supplied as needed to maintain the concentration of oxygen in the breathing apparatus at a partial pressure near 0.5 atmosphere.

Referring again to matter of preventing signal strength from rising above or falling below certain fixed limits, herein referred to as "clipping," it may be helpful to discuss the reaction of the system to the new "intelligence" as such appears in use. Such discussion can hardly be more than an approximation because it must be understood that the system is in use, i.e., dynamic, and therefore the example can only be taken as real in contemplation of the system becoming static until its reaction is complete.

As aforesaid the three voltage sources are averaged. The average input in use, and being processed thru to point D and the solenoid 40, is about 2.4 volts or slightly higher. If the signal of one sensor were gradually falling due to some malfunction, the oxygen concentration would rise due to the higher signal values required of the remaining two correctly functioning sensors in order to maintain the said 2.4-volt average. Oxygen concentration would continue to rise until the erroneous signal was clipped at about 1.9 volts at which the oxygen concentration required to produce the signal strength needed from the correctly functioning sensors to hold the average would be about 0.53 atmosphere. Conversely, if a malfunctioning sensor were producing a rising signal the oxygen concentration would drop until clipping of the erroneous signal occurred at about 3.3 volts, resulting in an oxygen concentration of about 0.41 atmosphere.

It is thought that the manner of using the described embodiment of the invention will be quite apparent to those skilled in the art; however, by way of assistance the following procedure is set forth which has been found to be satisfactory.

Considering, for example, a dive of 300 feet, the oxygen supply tank should be pressured to approximately 2250 pounds. The inert gas tank, preferably helium and oxygen should be at a similar pressure. The carbon dioxide removing material should be fresh. Preferably, all batteries should be replaced. The sensors are supplied with about 2 drops, 1 N solution of potassium hydroxide and the membrane should then be positioned securely against potassium hydroxide loss in use. Obviously, the membrane should be free of grease etc. and undamaged. A Teflon or polyethylene membrane of about one mil thickness is found to be suitable. They are then secured in their holding base.

The valve orifice constituting part of the solenoid valve should be adjusted so as to avoid blasting. In normal use it has been found to be advantageous that the oxygen be pulsed into the system for about 3 seconds every 15 to 20 seconds. This intermittent flow will be seen to reduce battery drain. The electric switch is turned on and calibration of the instrument is completed as heretofore described.

The parts are then assembled. Care being taken against leakage.

There then being only 20 percent oxygen operating the system, the alarm circuitry will be sounding.

With the mouthpiece in place, the equipment is taken into the water to a depth of a few feet and the main oxygen supply valve leading to the solenoid valve is turned on whereby the wanted oxygen begins to flow into the system. The helium valve is then opened to start pressure equalization. With the pressure equalized the system will come to approximately 0.5 atmosphere oxygen partial pressure under normal breathing within about 30—40 seconds. As the descent is thereafter continued to the established depth, helium is constantly fed in as needed to balance the pressure. The system should be closely observed for any sign of fault.

It will be appreciated that those utilizing the device of this invention will need to become thoroughly experienced with it, at which time they may choose different courses of action in circumstances where one or more of the indicators show oxygen partial pressure outside the established range. Until such experience is gained, and preferably thereafter, of course, if a warning signal is heard or one or more meters show outside the range, the dive should be aborted at once. In any event, cause for alarm should be the signal to switch to reserve batteries, and, even though such batteries restore normal conditions, the dive should be aborted, since obviously the reserve batteries may cause a similar result; however, so long as the reserve batteries provide proper operation of the system, the system may be utilized in reaching the surface.

Some observations from experience in use may be helpful. Should the indicators by any chance show oxygen at a too high level, for example, indicating close to the top end of the range or above, it may be that the bypass oxygen line is pouring oxygen into the system at a very high rate. Accordingly, it should be checked to assure that it is closed. If the valve is not open, the main oxygen supply should be cut off and the system exhausted of gas content by compressing the breathing bag. Return to the surface should then be by way of valving in the helium supply which contains 10 percent oxygen (although this may be varied) and will support the needs of the diver during the ascent. In feeding in the helium-oxygen supply, the bag should be reinflated and the gas breathed until the meters show about 40, meaning an oxygen partial pressure of about 0.4 atmosphere. The helium mixture should be resupplied in cycles, which should occur under normal breathing about every 30 to 40 seconds or replenished with oxygen by opening the tank valve and bleeding in oxygen using the meter as a guide.

Should it occur that all meters read too low, the probability is that the solenoid valve is not working. Oxygen is of course then valved in manually, the content being monitored by the partial pressure indicators.

Should all meters read zero it is apparent that the circuitry is inactive, and that the meters cannot be employed for monitoring oxygen. In such case, the helium supply is relied upon as above described. It goes without saying that the dive program should never leave the diver with less useable oxygen than required for his safe return to the surface regardless of other considerations. Calculations in this regard are well known to those skilled in the art and need not be described herein.

While embodiments of an electronic control apparatus of the present invention have been described in detail, other embodiments and numerous modifications are contemplated as being within the invention, and the scope and spirit of the claims herein.

Having described a system involving three monitoring stages, it is desired to point out that any desired number of monitor stages may be similarly employed. It is again pointed out that three such stages provide significant advantages over a single stage or two stages, especially when employed in relation to clipping circuitry, as herein described, or similarly effective means for nullifying or otherwise eliminating an unwanted signal. It is further pointed out that clipping as herein described is not mandatory provided other means are included in the circuitry for elimination or nullification of an unwanted signal, such means being compatible with requirements of the oxygen input means, including its actuating circuitry. For example, means may be provided even for manual switching when the alarm sounds in order to void an unwanted signal in a three signal system.

Among the possible other embodiments, are embodiments in which the averaged signal, developed from the plurality of processed signals from the plurality of signal-processing amplifiers, is directly utilized to control a switching device for the valve controlling solenoid or the like, thus, replacing the operational amplifier; however, such amplifier is highly desirable because of the steepness of slope at the zero crossover point and the simplicity of circuitry by which such slope is provided. Obviously the averaging amplifier may be replaced by a multivibrator.

Thus, as applied to diver breathing apparatus and similar applications, the invention extends more broadly to the provision of plural means for delivering a corresponding number of signals proportional to oxygen concentration, and means for combining said signals and thereafter employing the resulting combined signal to operate oxygen supply means in a manner to supply oxygen according to predetermined concentration, there also preferably being associated means for indicating the oxygen concentration represented by each such signal and/or relevant sensible alarm means. However, where the invention is applied in situations involving the control of the environment relative to material rather than human or animal life, the indicator — alarm provision may be replaced by operation stopping means, or such may be an added feature together with the indicator and/or alarm feature. Thus, for example, where a chemical process is under automatic gas control the system may be employed to effect control while guarding against a dangerously explosive mixture. From this it will be apparent that the invention is not limited to the control of an oxygen environment; rather it is applicable to a wide variety of operations where a condition, e.g., a nitrogen atmosphere, is critical or a temperature range is critical, the sensing means being replaced by a means responsive to the condition. Additionally, the invention may be employed to monitor a fluid and control a condition therein, for example, an oxygen-containing breathable liquid.

Still more narrowly however, and as applied to oxygen concentration or otherwise, the invention preferably includes means which may be plural, for eliminating, or effectively nullifying, one or more unwanted signals, while still leaving the oxygen supply means operable to supply oxygen within a safely breathable range related to the user's environments or changing environment as such may be following signal rejection, such means preferably being electrical. Moreover, such means may be or involve alternate circuitry relative and responsive to the modified signal for operating the input means.

Further, it is pointed out that any suitable type of oxygen sensing or monitoring device may be employed; and that different types, or modification of the same type of such, may be employed within the same operating unit. Additionally, different types, or modified types may be employed in the same unit, they being of suitable reliability, thereby affording assurance against the occurrence of plural simultaneous failure or fault due to a common cause or inherent characteristic. Thus, similarly reserve batteries may be from a source different from those in operation, or they may be from a different lot.

Further, it is remarked that the range for oxygen concentration (0.4—0.7 atmosphere is regarded as particularly suitable for use under the conditions described herein, especially in relation to the diver breathing equipment; however, such is revealing of the potential of the system rather than limiting upon the invention. The range and the control point could, of course, be made variable by means obvious to those skilled in the art. Moreover, the desired concentration may be related and controlled according to any suitable voltage level. Additionally, the invention herein does not require that the oxygen level be held constantly near 0.5 atmosphere; rather, while such is desireable in the described embodiment, deviation therefrom may be substantial, and then replenishment, may take place, such permitting, for example, the use of equipment involving a slower response to oxygen depletion and/or the applied signal.

The expression "signal failure" is used in the claims hereinafter presented in a broad sense, and it is intended to refer to all possible variations of signal value from the normal gas concentration proportional value, including the absence of a signal as would result, for example, from a dead sensor. The term "spurious" refers to a signal which is erroneous, either at a fixed or changing value, in relation to gas concentration. As will be understood a spurious signal may degrade to the point of complete absence of a signal. In the course of such, however, it will have been limited in effect by the clipping circuitry.

We claim:

1. A closed circuit underwater breathing apparatus which maintains the concentration of oxygen within a zone at or near a predetermined desired level, which comprises at least three (3) separate means for sensing the instant oxygen concentration existing in said zone and for producing separate signals normally proportional thereto, means for receiving said three signals and delivering thereupon a combined signal output normally similarly proportional to said concentration; oxygen supply control means responsive to said output and operable to effect adjustment of said oxygen concentration in said zone when said output deviates from a value corresponding to said desired level; said device also including means for controlling the effect of either of said separate signals upon said output in the event of an occurrence leading to a signal failure, whereby said output continues to be compatible with the operational characteristics of said oxygen supply control means and said concentration is maintained substantially as normal notwithstanding such occurrence.

2. A closed circuit underwater breathing apparatus as claim in claim 1 wherein said combined signal is an average of said three or more signals, and including a separate physiologically compatible gas supply for internal pressure adjustment.

3. A device as claimed in claim 1 wherein metering means is provided for each of said proportional signals.

4. A device as claimed in claim 3 wherein the said combined signal is an average of said three or more signals.

5. A device as claimed in claim 1 wherein warning means is provided to give notice of signal failure.

6. A device as claimed in claim 3 wherein warning means is provided to give notice of signal failure.

7. A device as claimed in claim 4 wherein warning means is provided to give notice of signal failure.

8. A closed circuit, self contained breathing apparatus comprising:
  1. three or more oxygen sensor cells located in said closed circuit adapted to provide electrical signals proportional to oxygen concentration;
  2. separate means for amplifying each of said signals;
  3. separate indicator means responsive to each amplified signal providing data in terms of oxygen partial pressure over the range of zero to one atmosphere;
  4. means for combining said amplified signals and delivering thereupon an average output proportional to said oxygen concentration, said output controlling the input of oxygen via a solenoid operated valve and associated circuitry such that said valve is closed at a predetermined oxygen concentration falling within a preselected physiologically tolerable oxygen concentration range and opens to deliver oxygen when said output represents an oxygen concentration below the said predetermined concentration;
  5. electronic clipping circuitry effective to (a) limit the signal value of any one of said three or more signals when their value reaches a level corresponding to oxygen concentration at about the limits of or outside the said preselected range, and (b) effect the inclusion of a limited signal value in said average which is not outside the range of values corresponding to said predetermined range of oxygen concentration;
  6. audible alarm means connected in the electronic circuitry of said device, said alarm being adapted to sound upon the limiting of any signal value by said clipping circuitry;
  7. manual means for depriving said valve of oxygen and means for effecting the delivery of oxygen to said breathing circuit manually; and
  8. diluent gas supply means connecting into said breathing circuit.